(No Model.) 4 Sheets—Sheet 1.

P. B. DONAHOO.
STREET SWEEPER.

No. 521,852. Patented June 26, 1894.

Witnesses
Wm. M. Rheem
Wm. F. Heming

Inventor
Peter B. Donahoo
By Bond, Adams, Pickard & Jackson
his Attys

THE NATIONAL LITHOGRAPHING COMPANY,
WASHINGTON, D. C.

(No Model.)

P. B. DONAHOO.
STREET SWEEPER.

No. 521,852.

4 Sheets—Sheet 3.

Patented June 26, 1894.

Witnesses
Wm. N. Rheem.
Wm. F. Heming

Inventor
Peter B. Donahoo
By Bond, Adams, Pickard & Jackson.
his Atty's (No Model.) 4 Sheets—Sheet 4.
P. B. DONAHOO.
STREET SWEEPER.
No. 521,852. Patented June 26, 1894.
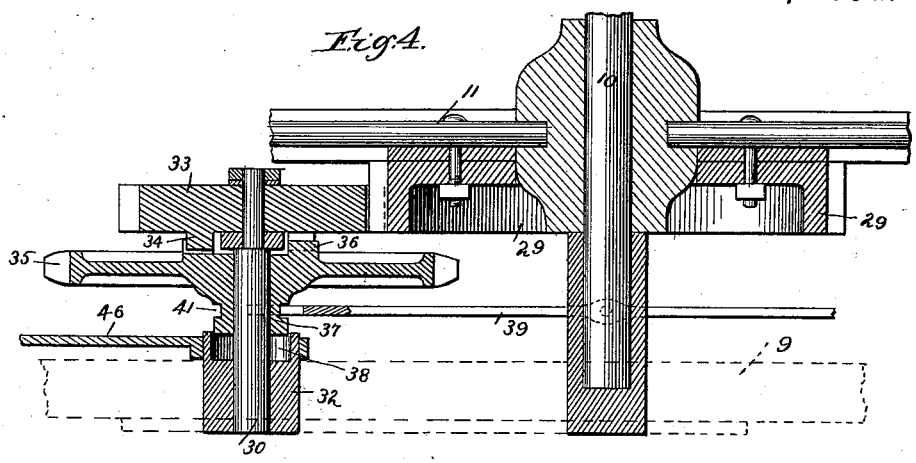
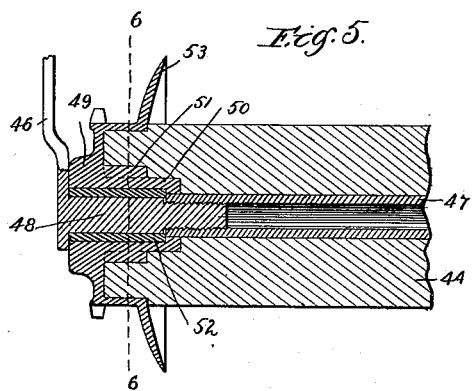
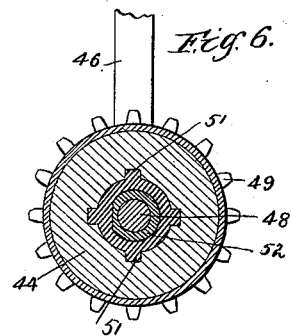
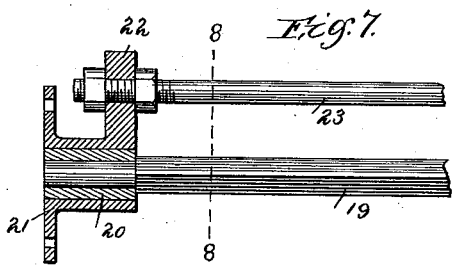
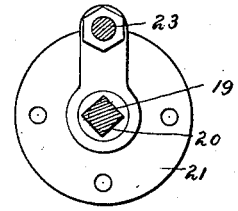
Witnesses. Inventor
Peter B. Donahoo
By Bond Adams Pickard Jackson
his Atty's.

United States Patent Office.

PETER B. DONAHOO, OF SAN FRANCISCO, CALIFORNIA, ASSIGNOR TO GEORGE S. SWITZER, OF SAME PLACE, AND HUGH R. BEAN AND GEORGE B. SINCLAIR, OF CHICAGO, ILLINOIS.

STREET-SWEEPER.

SPECIFICATION forming part of Letters Patent No. 521,852, dated June 26, 1894.

Application filed January 21, 1893. Serial No. 459,263. (No model.)

*To all whom it may concern:*

Be it known that I, PETER B. DONAHOO, a citizen of the United States, residing at San Francisco, in the county of San Francisco and State of California, have invented certain new and useful Improvements in Street-Sweepers, of which the following is a specification, reference being had to the accompanying drawings, in which—

Figure 1:
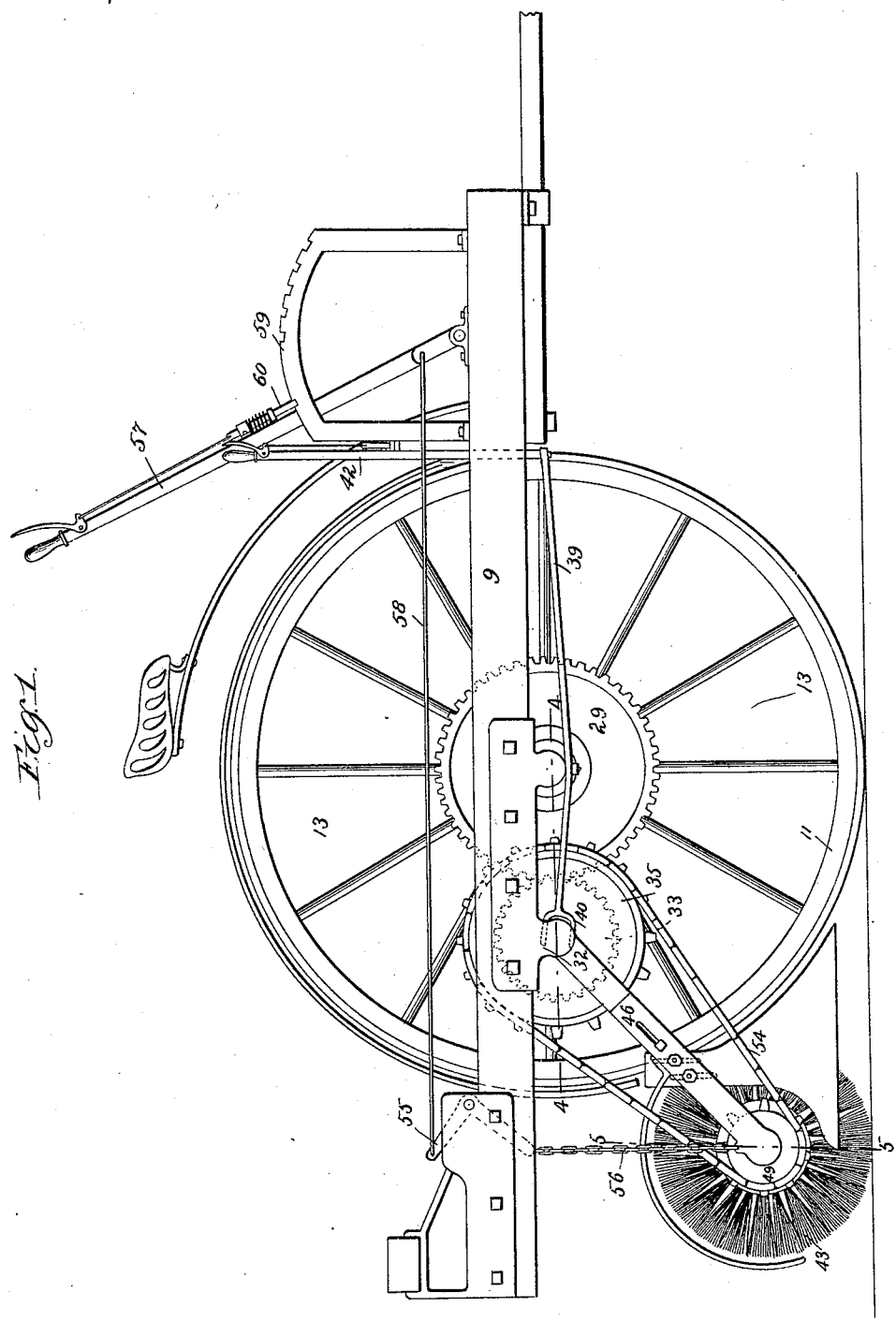
Figure 2:
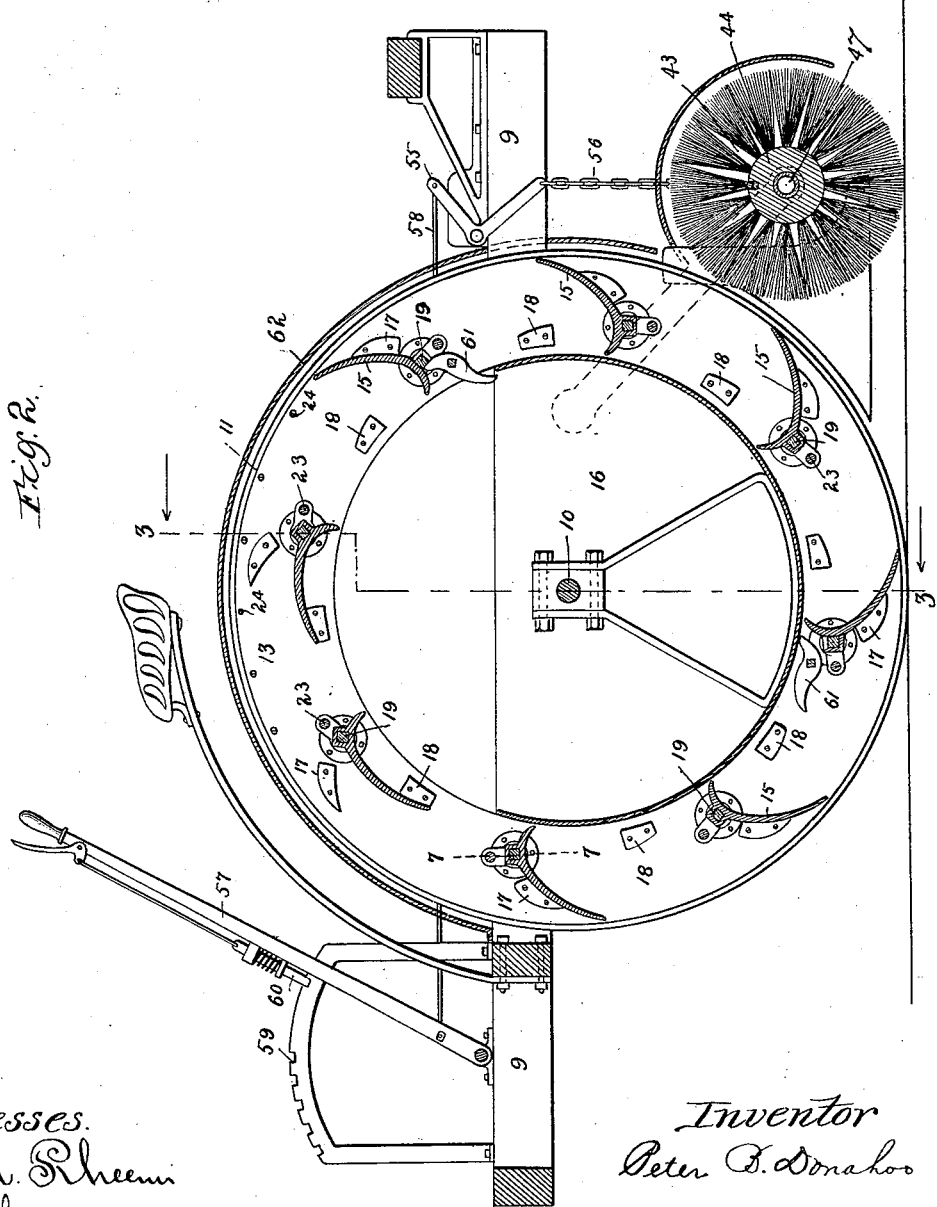
Figure 3:
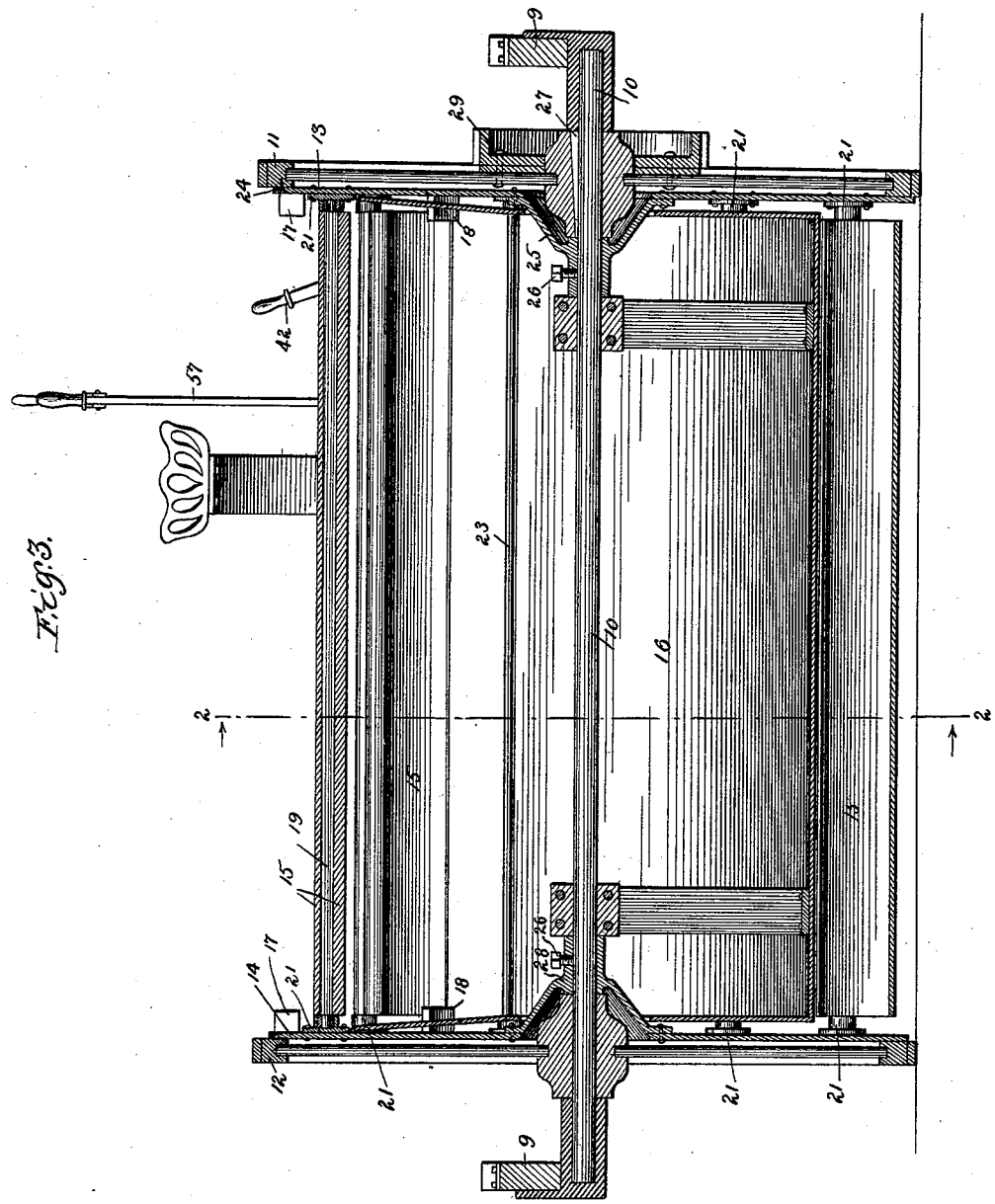

Figure 1 is a side elevation. Fig. 2 is a longitudinal vertical section on line 2—2 of Fig. 3. Fig. 3 is a vertical cross section on line 3—3 of Fig. 2. Fig. 4 is an enlarged detail, being a horizontal section on line 4—4 of Fig. 1. Fig. 5 is a vertical section of the drum hub, line 5—5 of Fig. 1. Fig. 6 is a vertical section on line 6—6 of Fig. 5. Fig. 7 is a section showing the brackets which support the buckets, being taken on line 7—7 of Fig. 2. Fig. 8 is a section on line 8—8 of Fig. 7.

My invention relates to street sweepers, and has for its object to improve the construction of the sweeper shown in Patent No. 469,551, granted to me February 23, 1892. I accomplish this object as hereinafter specified and as illustrated in the drawings.

That which I regard as new will be pointed out in the claims.

Referring to the drawings it will be seen that my improved sweeper is in many respects similar to that shown in my patent above referred to, as it consists of a sweeper frame 9, carrying a shaft 10, upon which are mounted carrying wheels 11 and 12. Adjacent to the inner surface of the wheel 11 is placed a disk 13, and adjacent to the wheel 12 is placed a disk 14, as best shown in Fig. 3. Between the disks 13 and 14 are carried buckets 15, pivotally mounted near the outer portion of the disks. Any suitable number of buckets 15 may be provided, the number being determined by the size of the disks and of the buckets.

Suspended upon the shaft 10 between the disks 13 and 14 is a semi-cylindrical receptacle 16 adapted to receive the dirt as it is emptied from the buckets 15. The buckets 15 are arranged to be overturned by gravity when they pass over the receptacle 16, substantially as described in my former patent.

To hold the buckets 15 in operative position to receive the dirt, stops composed of blocks 17 are provided, which blocks are attached to the inner sides of the disks 13 and 14 at some distance from the peripheries or outer edges thereof, as best shown in Fig. 3 in such manner that the stops are adapted to receive the rear surfaces of the buckets, for holding the buckets in operative position until they arrive over the receptacle 16.

18 indicates stops which are also carried by the disks 13 and 14, and serve to limit the downward motion of the buckets 15 when they are overturned by the action of gravity, as best shown in Fig. 3.

In order to support the buckets 15 more securely and to improve their operation, I mount them upon shafts 19, the ends of which are circular in cross section and are mounted in suitable bearings 20 carried in brackets 21 secured to the disks 13 and 14. The construction of the brackets 21 is best shown in Fig. 7. Each bracket is provided with an arm 22, which projects therefrom, as best shown in Figs. 7 and 8, and the opposite brackets are connected by a rod 23, as best shown in Figs. 3 and 7. By this construction the disks 13 and 14 are securely held together and the operation of the buckets is rendered smooth and firm.

The disk 13 is firmly secured to the wheel 11, preferably by screws 24 passing through its outer edge and into the rim of the wheel, as best shown in Fig. 3. The disk 13 is provided with a hub 25 fitted upon the shaft 10, as shown in Fig. 3.

26 indicates a set-screw by means of which the hub 25 is keyed to the shaft 10. Any other suitable means, however, may be provided for keying the hub of the disk to said shaft. The wheel 11 is also keyed to the shaft 10 by means of a key or by any other suitable device.

The disk 14 is not connected to the wheel 12, but is provided with a hub 28 similar to the hub 25 of the disk 13. The hub 28 is also keyed to the shaft 10. By this construction the two disks 13 and 14 will be rotated by the rotation of the wheel 11 but not by the rotation of the wheel 12, thereby permitting independent rotation of said wheels 11 and 12 as may be necessary, such as in turning corners.

20 indicates a gear wheel, which, as shown, is rigidly connected to the outer face of the wheel 11. Said wheel, however, may be secured in any other suitable manner, so as to rotate with the wheel 11.

30 indicates a shaft, supported at one end in a boss 32 formed on the frame 9 as best shown in Fig. 1.

33 indicates a pinion mounted upon the shaft 30 in position to intermesh with the gear 29, as shown in Fig. 4. The pinion 33 carries a clutch section 34 on one face, as shown in Fig. 4.

35 indicates a sprocket wheel which is mounted upon the shaft 30, and is provided with a clutch section 36 adapted to engage the clutch section 34, whereby the sprocket wheel 35 may be rotated by the rotation of the pinion 33. Upon the side of the sprocket wheel 35 opposite that which carries the clutch section 36 is provided a sleeve 37, preferably formed integral with the hub of the sprocket wheel 35, as shown in Fig. 4.

38 indicates a recess formed in the boss 32, of sufficient size to receive the sleeve 37 and thereby permit lateral motion of the sprocket wheel 35; the object of which is to permit of the clutch section 36 being thrown out of engagement with the clutch section 34.

39 indicates a lever pivotally connected to the frame 9, and being connected to the sleeve 37 in such manner as to permit of the rotation of the wheel 35 to prevent lateral motion of the sleeve 37 independently of the lever 39. As shown in Fig. 1, I secure this result by providing the lever 39 with a fork 40, which fits into a recess 41 formed in the sleeve 37.

42 indicates a hand-lever, which is connected to the lever 39 and by means of which said lever 39 may be operated to throw the clutch sections 34 and 36 into or out of engagement with each other. Any ordinary locking device, such as a rack and dog, may be provided for locking the lever 42 in any desired position.

43 indicates a rotary brush, of which 44 is the hub. The hub 44 is mounted on a tubular shaft 47, supported by bars 46 carried at opposite sides of the frame 9. The forward ends of the bars 46 are pivoted to the frame 9, and their rear and lower ends are connected to the tubular shaft 47, upon which is mounted the hub 44 of the brush 43. I secure the bars 46 to the shaft 47 by providing them with screws 48, which screw into said shaft, as shown in Fig. 5.

49 indicates a sprocket wheel, one of which is preferably provided at each end of the hub 44, the object of which will be more fully hereinafter set forth. Each sprocket wheel 49 is provided with an extended hub 50, which projects into the end of the hub 44 of the brush, and it is provided with lugs 51 on its surface to prevent it from rotating independently of the hub 44.

52 indicates a bushing between the sprocket wheel hub 50 and the screw 48.

53 indicates a guard preferably formed integral with the sprocket wheel 49, which guard serves to protect the end of the brush. A guard is provided at each end of the brush.

54 indicates a link belt by means of which the sprocket wheel 49 is geared to the sprocket wheel 35, as best shown in Fig. 1.

55 indicates a bell crank lever, suitably mounted in the frame 9 over the lower end of the rod 46, as shown in Fig. 1.

56 indicates a chain which connects one arm of the bell crank lever to the bar 46 at its lower end.

57 indicates a lever for operating the bell crank lever 55 to raise or lower the lower end of the bar 46 and brush, through a connecting rod 58.

59 indicates a segmental rack, suitably mounted in the frame in position to be engaged by a dog 60 carried by the lever 57, for locking the lever 57 at any desired point.

To upset the receptacle 16, I provide one or more pivoted bars 61, which are pivoted to one of the disks 13 or 14. The bars 61 are adapted to be held by gravity in substantially a vertical position, one arm being heavier than the other, and the bars are so placed with reference to the bucket-supporting shafts 19 that such shafts will act as stops to limit the outward motion of the upper arms of said bars. The shape of the bars is such that when they arrive upon a level with the upper edge of the receptacle 16 the lower arm will swing inward over the edge of such receptacle, as shown in Fig. 3, the upper end then resting against the adjacent shaft 19. The position of one of the bars at the time it reaches the level of the upper edge of the receptacle 16 is shown in Fig. 2. By now backing the sweeper the disks 13 and 14 will be caused to rotate in an opposite direction, and the lower arm of the bar 61 will engage the upper edge of the receptacle, and as the disks continue to rotate the receptacle will be overturned.

62 indicates a covering or shield which extends over the tops of the disks 13 and 14 and buckets 15.

In large machines I prefer to provide driving mechanism similar to that above described, for rotating the brush, and in such cases the two sprocket wheels are used. Where driving mechanism is provided only on one side, by securing a sprocket wheel at each end of the brush, the brush may be reversed to secure uniform wear upon the bristles.

That which I claim as my invention, and desire to secure by Letters Patent, is—

1. In a street sweeper, the combination with rotary carriers, and buckets carried thereby, of a receptacle adapted to receive dirt from said buckets, means for delivering dirt from said buckets into said receptacle, and devices for automatically overturning said receptacle, substantially as described.

2. In a street sweeper, the combination with rotary carriers, and buckets carried thereby, of a receptacle adapted to receive dirt from said buckets, means for delivering dirt from said buckets into said receptacle, and mechanism operating to overturn said receptacle only when the sweeper is backed, substantially as described.

3. The combination with a rotary carrier, and buckets carried thereby, of a dirt receptacle suspended within the circle of said buckets, and a bar carried by said carrier and adapted to automatically engage said receptacle when the carrier is rotated in a reverse direction, substantially as described.

4. The combination with disks 13 and 14, a receptacle 16, and a shaft 10 supporting said receptacle, of an arm 61 supported by one of said disks and adapted to engage the edge of said receptacle when the disks are rotated in a reverse direction, substantially as described.

5. In a street-sweeper, the combination with a shaft 10, of carrying-wheels 11 and 12, one of which is loose on the shaft and the other one of which is keyed to the shaft to rotate the latter in either direction, disks 13 and 14 mounted upon the shaft and adapted to rotate therewith, buckets carried by the disks, means for sweeping dirt into the buckets, a dumping receptacle arranged within the circle of the buckets, and means for dumping the receptacle by backing the sweeper, substantially as described.

6. In a street-sweeper, the combination with a shaft 10, of carrying-wheels 11 and 12, one keyed to the shaft and the other loose thereon, disks 13 and 14, one of which is keyed to the shaft and rigidly attached to the carrying-wheel which is keyed to the shaft, buckets carried by said disks, means for sweeping dirt into said buckets, a dumping receptacle arranged within the circle of the buckets, and means for dumping the receptacle by backing the sweeper, substantially as described.

7. The combination with rotary supporting disks or plates 13 and 14, and tilting buckets 15 pivoted thereto, of an outer and an inner series of independent stop blocks rigidly attached to the inner sides of the said disks or plates and respectively supporting the buckets in operative position and when overturned, substantially as described.

8. The combination with disks, as 13 and 14, of brackets 21 carried thereby, rods 23 connecting brackets of opposite disks, shafts 19 journaled in said brackets, and buckets carried by said shafts, substantially as described.

9. The combination with a street sweeper frame, of a rotary brush having a hollow hub 44, a non-rotary shaft 47 extending through the brush-hub and on which the latter rotates, and suspended rods 46 having screws 48 projecting laterally from their lower ends, screwing into the ends of the said non-rotary shaft and provided with bearings which support the ends of the rotary brush-hub, substantially as described.

10. The combination with a street sweeper frame, of a rotary brush having a hollow hub 44, a non-rotary shaft 47 extending through the brush-hub and on which the latter rotates, and suspended rods 46 having rigid screws 48 at their lower ends which screw into the ends of the non-rotary shaft, substantially as described.

11. The combination with a rotary brush having a hub 44, of a sprocket-wheel 49 formed integral with the guard 53 and with the central laterally projecting hollow hub 50 extending into the end of the rotary brush-hub, and a support extending into said hollow hub, and on which said hub rotates, substantially as described.

12. The combination with a rotary brush having a hub 44, of sprocket-wheels 49 having guards 53 and central laterally projecting hubs 50 which extend into the ends of the rotary brush-hub, suspended rods 46 having screws 48 at their lower ends, a non-rotary shaft 47 on which the brush-hub rotates and into which the said screws of the suspended rods are screwed, and bushings 52 interposed between the hubs of the sprocket wheels and the said screws, substantially as described.

PETER B. DONAHOO.

Witnesses:
A. H. ADAMS,
JOHN L. JACKSON.